(12) United States Patent
Chang-Tsun et al.

(10) Patent No.: US 8,565,529 B2
(45) Date of Patent: Oct. 22, 2013

(54) METHODS FOR IDENTIFYING IMAGING DEVICES AND CLASSIFYING IMAGES ACQUIRED BY UNKNOWN IMAGING DEVICES

(75) Inventors: Li Chang-Tsun, Kenilworth (GB); Richard Leary, Ninian Way (GB)

(73) Assignee: Forensic Pathways Limited, Tamworth Staffordshire (GB)

( * ) Notice: Subject to any disclaimer, the term of this patent is extended or adjusted under 35 U.S.C. 154(b) by 0 days.

(21) Appl. No.: 13/201,558

(22) PCT Filed: Feb. 15, 2010

(86) PCT No.: PCT/GB2010/050247
§ 371 (c)(1),
(2), (4) Date: Dec. 23, 2011

(87) PCT Pub. No.: WO2010/092407
PCT Pub. Date: Aug. 19, 2010

(65) Prior Publication Data
US 2012/0087589 A1     Apr. 12, 2012

(30) Foreign Application Priority Data
Feb. 13, 2009  (GB) .................................. 0902403.5

(51) Int. Cl.
*G06K 9/46* (2006.01)
*G06K 9/40* (2006.01)

(52) U.S. Cl.
USPC .......................................... 382/190; 382/263

(58) Field of Classification Search
USPC ......... 382/159, 190, 209, 218, 224, 263–264, 382/266
See application file for complete search history.

(56) References Cited

U.S. PATENT DOCUMENTS 7,609,846 B2 * 10/2009 Smith et al. ................... 382/100
7,787,030 B2 *  8/2010 Fridrich et al. ............... 348/241

FOREIGN PATENT DOCUMENTS

| EP | 1408449 A2 | 4/2004 |
| WO | 2006017011 A1 | 2/2006 |
| WO | 2006017031 A1 | 2/2006 |
| WO | 2006091928 A2 | 8/2006 |
| WO | 2007094856 A2 | 8/2007 |

OTHER PUBLICATIONS

McCloskey S Ed—Sivic J et al: "Confidence weighting for sensor fingerprinting," Computer Vision and Pattern Recognition Workshops, 2008. CVPR Workshops 2008. IEEE Computer Society Conference on, IEEE, Piscataway, NJ, USA, Jun. 23, 2008, pp. 1-6.

(Continued)

*Primary Examiner* — Daniel Mariam
(74) *Attorney, Agent, or Firm* — Fraser Clemens Martin & Miller LLC; J. Douglas Miller

(57) ABSTRACT

A method of classifying an image taken by an image capture device, the method comprising the steps of: extracting an initial Sensor Noise Pattern (SNP) for the image; enhancing the initial SNP to create an enhanced SNP by applying a correcting model, wherein the correcting model scales the initial SNP by a factor inversely proportional to the signal intensity of the initial SNP; determining a similarity measure between the enhanced SNP for said image with one or more previously calculated enhanced SNPs for one or more different images; and classifying the image in a group of one or more images with similar or identical SNPs based on the determined similarity measure.

12 Claims, 7 Drawing Sheets

(56) References Cited

OTHER PUBLICATIONS

GB exam report Mar. 11, 2011.
GB exam report Mar. 15, 2011.
GB exam report ltr Mar. 11, 2011.
PCT—Search report dated Aug. 6, 2009.
PCT—further Search report dated Oct. 26, 2009.
McCloskey S Ed—Sivic J et al: "Confidence weighting for sensor fingerprinting" Computer Vision and Pattern Recognition Workshops, 2008. CVPR Workshops 2008. IEEE Computer Society Conference on, IEEE, Piscataway, NJ, USA, Jun. 23, 2008, pp. 1-6.

* cited by examiner

METHODS FOR IDENTIFYING IMAGING DEVICES AND CLASSIFYING IMAGES ACQUIRED BY UNKNOWN IMAGING DEVICES

CROSS-REFERENCE TO RELATED APPLICATIONS

This application is a National Stage of International Application No. PCT/GB2010/050247, filed Feb. 15, 2010, which in turn claims priority to GB Application No. 0902403.5 filed Feb. 13, 2009. The entire disclosures of the above applications are hereby incorporated herein by reference.

TECHNICAL FIELD OF INVENTION

The invention relates to a method of extracting and enhancing a Sensor Noise Pattern (SNP) or fingerprint from an image, the SNP being an intrinsic characteristic of the camera which took the image, and comparing the extracted SNP with other SNPs in order to identify other images that contain an identical or similar SNP. In particular, but not exclusively, the present invention is used in the fields of digital forensics in order to identify images taken by the same camera.

BACKGROUND TO THE INVENTION

It is known, and desirable, in the field of digital forensics to identify images taken from a particular camera. This is of particular importance, in fields such as criminal investigation, where an investigator wishes to prove that an individual image, or images, were taken using a specific camera. The classification of images from one or more devices also has applications in commercial sectors, such as, classifying of images, cataloguing, managing image processing etc. For example, if the photo is of an indecent nature, e.g. child pornography, being able to prove that the camera was used to take a given photo may be used as evidence against the owner of the camera. In particular, if a link between an individual and a particular camera can be established, e.g. the camera may be recovered in a raid, being able to prove that a specific photo, or photos, originates from that camera allows investigators to determine a causal link between the owner and the images.

A method of identifying a camera is via information contained in the metadata of a digital photo. Such metadata may often contain information such as the time and date a photo was taken, as well as a device identifier such as a camera name. However, criminals taking indecent photos will often remove such data in order to subvert the identification process. Some types of camera will automatically embed a watermark or hash mark into the photos taken with the camera. However, not all cameras have this ability and therefore this identification method is limited to those images taken with those particular makes and models. It is therefore desirable to be able to extract a signal that is present in all makes and models of devices that this is not easily subvertible.

In particular it is desirable, given a set of digital imaging devices such as cameras and scanners, to identify one of the devices that have been used in the acquisition of an image under investigation or return a negative report indicating that the image is taken by an unknown device.

It is known that each camera will have a unique intrinsic sensor noise pattern (SNP) which results from the inhomogeneities of sensor of the camera. The inhomogeneities are specific to a particular sensor and therefore allow for the unique identification of a camera via its sensor or CCD. The term fingerprint and SNP will be used interchangeably in this specification. This SNP is present in every images taken by a device, though without processing of the image it is often indistinguishable from the detail of an image.

WO/2007/094856 identifies a method of extracting the SNP present in an image, and comparing the extracted SNP with a set of reference SNPs. These reference SNPs are constructed from imaging devices that are accessible by the investigator. Each reference SNP is constructed by taking the averaged version of the SNPs extracted from a number (of the order of several tens) of low-variation images (e.g., blue sky images) taken by the same device.

A disadvantage of WO/2007/094856 is that the SNPs extracted from images may be highly contaminated by the details from the scene and as a result the misclassification rate is high. To compensate for the influence from the details of the scene, the whole image has to be analysed in order to achieve an acceptable identification rate. This may result in unacceptably high demands of computational resources. A further disadvantage is the construction of the reference SNP requires several low-variation images, which without possession of the originating device may not be possible to obtain.

Additionally, during a digital forensic investigation the image set that needs to be analysed may contain several thousand images taken by an unknown number of unknown devices. The method of comparison in WO/2007/094856 is a pair-wise comparison method which becomes prohibitively expensive for large data sets.

Typically, a forensic investigator will want to identify, or cluster, images that have been taken by the same device. Some of the many challenges in such a scenario are:

the forensic investigator does not have the imaging devices that have taken the images to generate clean reference device fingerprints (such as the reference SNP) for comparison;

there is no prior knowledge about the number and types of the imaging devices;

the similarity comparison is pair-wise. With a large dataset, exhaustive comparison is computationally prohibitive; and given the shear number of images, analysing each image in its full size is computationally infeasible.

WO/2007/094856 may seem like a candidate method for the first and simpler task of fingerprint extraction. However, the influence from the details of the scene and the absence of the imaging devices, prevents the investigator from acquiring a clean reference SNP, therefore unless the investigator has a number of "clean" images from which to extract a SNP (which unless they are in possession of the originating device would be incredibly unlikely) this document has limited applications. Additionally, this document is unable to perform the clustering task to identify images taken from the same, possibly unknown, device.

Furthermore, it is desirable to be able to determine if two images from a data set have been taken with the same device. In particular, if neither the originating camera nor the SNP are within the possession of an investigator. Without the originating camera, nor the SNP such a determination is challenging.

SUMMARY OF THE INVENTION

To mitigate at least some of the above problems in the prior art, there is provided a method of extracting a SNP from a single image and removing the containments from said image to allow identification of other images that have the same or similar SNP.

According to an aspect of the invention there is provided a method of classifying an image taken by an image capture device, the method comprising the steps of: extracting an initial Sensor Noise Pattern (SNP) for the image; enhancing the initial SNP to create an enhanced SNP by applying a correcting model, wherein the correcting model scales the initial SNP by a factor inversely proportional to the signal intensity of the initial SNP; determining a similarity measure between the enhanced SNP for said image with one or more previously calculated enhanced SNPs for one or more different images; and classifying the image in a group of one or more images with similar or identical SNPs based on the determined similarity measure.

There is also provided a method of classifying a plurality images taken by one or more known or unknown image capture devices, the method comprising the steps of: for each image extracting an initial Sensor Noise Pattern (SNP) for the image; enhancing the initial SNP to create an enhanced SNP by applying a correcting model; identifying a subset of images from the plurality of images and; forming an image classifier based on the subset of images by identifying one or more clusters of images which have identical or similar SNPs, wherein the identification is based on a similarity measure between the enhanced SNP for a given image with one or more different images in the subset of images classifying one or more of the remaining images that were not part of the initial subset by calculating a comparative measure between the remaining images and each cluster as identified in the image classifier, and determining if said remaining image belongs to an identified cluster based on the comparative measure. Optionally wherein the correcting model scales the initial SNP by a factor inversely proportional to the signal intensity of the initial SNP There is also provided a method for classifying a large number of images based on their SNP, where the number of originating devices is unknown.

Further aspects, features and advantages of the present invention will be apparent from the following description and appended claims.

BRIEF DESCRIPTION OF THE DRAWINGS

An embodiment of the invention will now be described by way of example only, with reference to the following drawings, in which.

DETAILED DESCRIPTION OF AN
EMBODIMENT OF THE INVENTION

Figure 1:
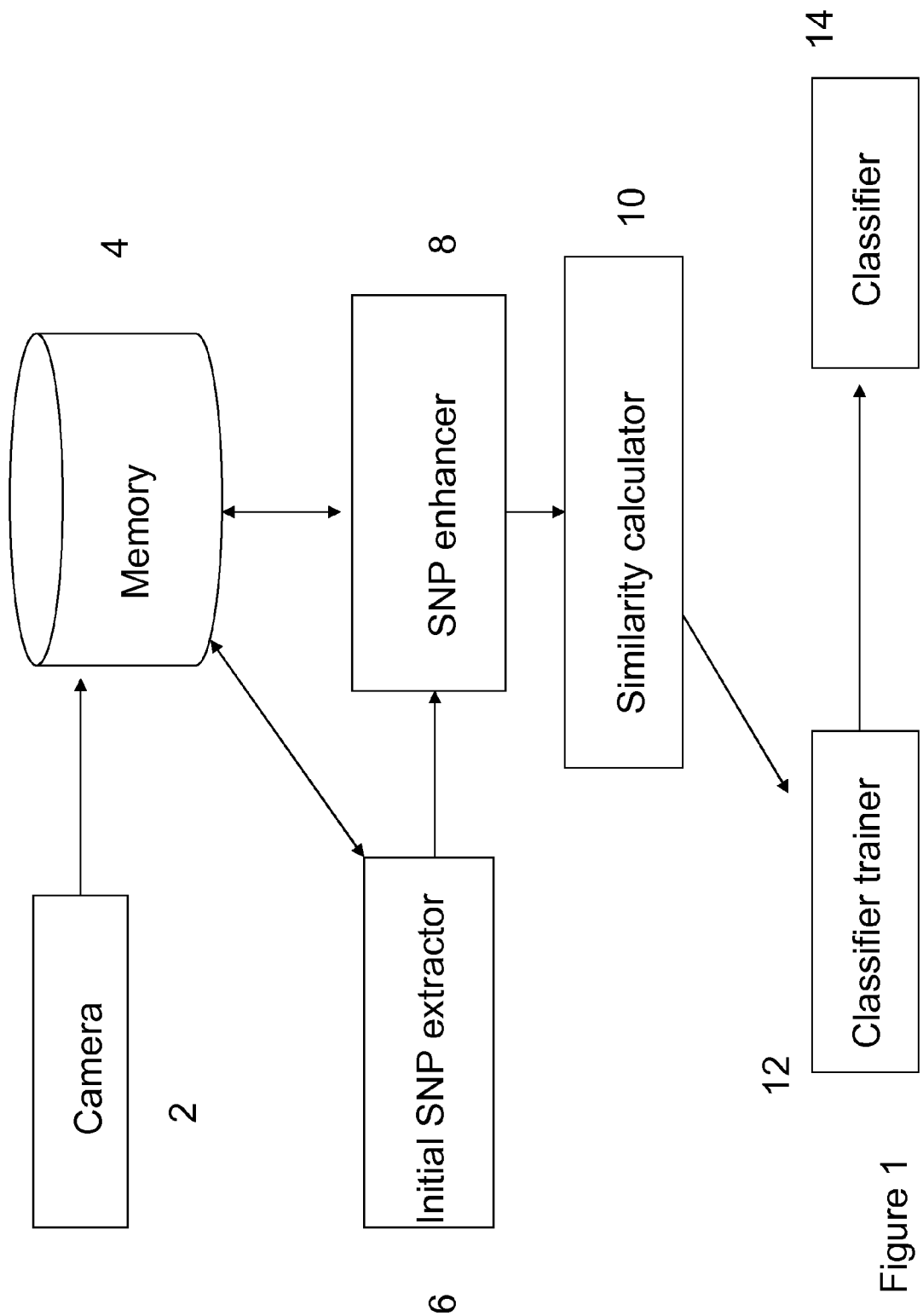
FIG. 1 is a schematic of the apparatus used in the present invention.

FIG. 1 shows a schematic of the apparatus used in the present invention, there is shown, a image source 2, database 4, a Sensor Noise Pattern (SNP) extractor 6, a SNP enhancer 8, a similarity calculator 10, a classifier trainer 12 and a classifier 14.

The image source 2 is any known source e.g. an image capture device such as a digital camera, the internet, a mobile telephone etc. The present invention is able to work with any images taken with a device that has a sensor to detect an image, as the SNP is an intrinsic property of the imaging device.

Images from the image store 2, are downloaded to a database 4. The term database 4 is used as a generic term to describe any memory store for a computer. A stored image is passed from the database 4 to the SNP extractor 6 where an initial SNP is extracted from the image. This process is discussed in further detail with respect to FIG. 2 and its corresponding text. The initial SNP is then passed from the SNP extractor 6 to the SNP enhancer 8. Optionally, the initial SNP may be stored on a form of writeable memory or database 4 for reference. The SNP enhancer 8 enhances the initial SNP. This process is described in detail with reference to FIGS. 2, 3 and 4 and their associated text. This enhanced SNP is also stored in the database 4. The enhanced SNPs for individual images are compared by the similarity calculator 10. The similarity calculator 10 is described further with reference to FIG. 2 and Equations 7 and 8 and their associated text.

The classifier 14 and the classifier trainer 12 contain suitable processing means to group images according to criteria based on their SNP. The function of the classifier trainer 12 and the classifier 14 are described in detail with reference to FIG. 5. Once a group of images has been identified based on their SNP characteristics these are preferentially stored in the database 4, with some means e.g. metadata, to identify the groups.

The present invention may be performed on a suitable computing device such as a desktop or personal computer, which is enabled to analyse and perform the calculations described herein. The skilled man would understand that the present invention may be implemented on a single computer, a network of computers or over the internet without deviating from the inventive concepts.

Figure 2:
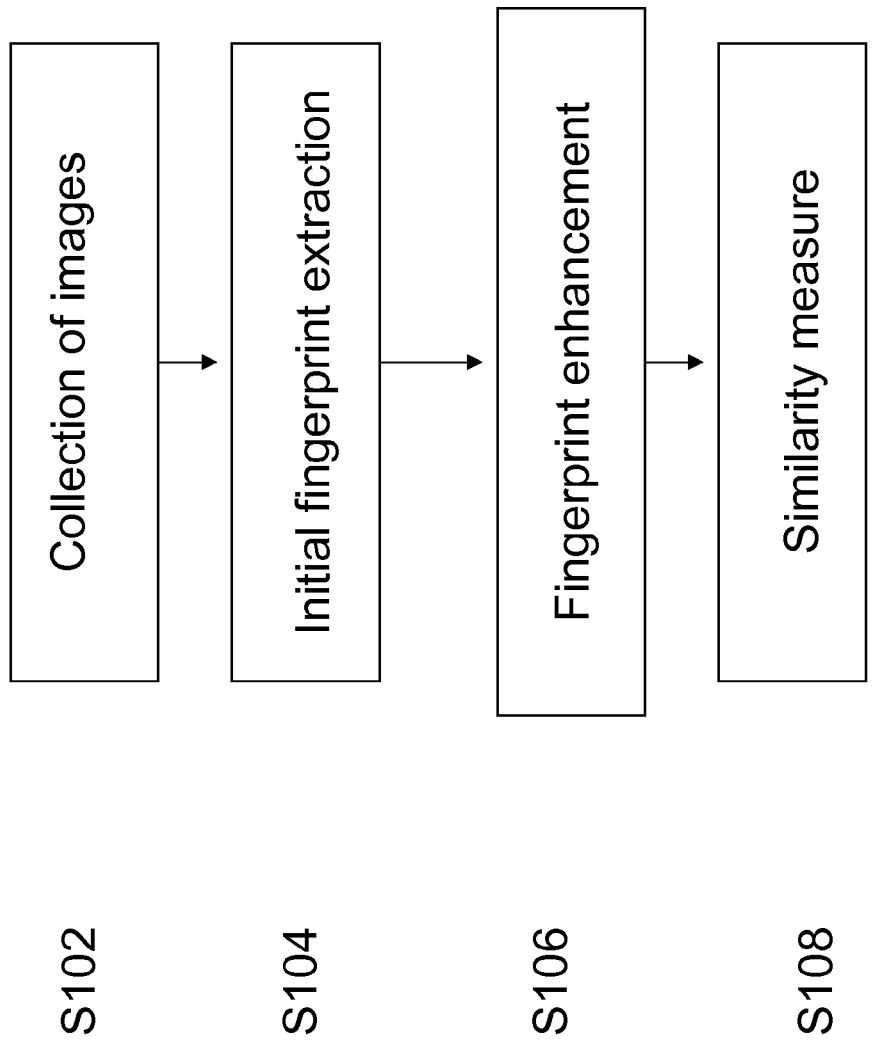
FIG. 2 is a flow chart of the processes of extracting a SNP and identifying a potential match involved according to an aspect of the invention.

FIG. 2 describes the overall process of extracting a SNP for a given image and identifying the originating device of the image or other images that originate from the same device according to an aspect of the invention.

There is shown the step of collecting the images at step S102, initial SNP extraction at step S104, enhancing the SNP at step S106, and calculating a similarity measure at step S108.

The collecting of images at step S102 may occur by any known method of image collection. In the field of Forensic analysis this may involve the downloading of images of a hard drive of seized personal computer or images found on a website.

Once an image has been collected at S102 an initial SNP is extracted at step S104. The method used to extract the initial SNP is that as described in WO/2007/094856. The strength of the SNP is dependent on the sensor itself and the conditions in which the image was taken, and the contribution of the SNP for each individual image varies for each image and therefore needs to be determined for each image. The model used to extract the SNP, n, from an image I is $$n = I - F(I) \qquad (1)$$

where F is a denoising function which filters out the sensor noise pattern. The choice of the denoising function F is critical in the extraction of the SNP.

Various denoising filters may be used as F, and in the preferred embodiment, the wavelet-based denoising filter described in Appendix A of Lukáš et al. "Digital Camera Identification from Sensor Pattern Noise," *IEEE Transactions on Information Forensics and Security*, vol. 1, no. 2, pp. 205-214, June 2006, is used. This filter has been found to be an effective filter, though other denoising filters may be used. This wavelet based denoising filter filters the images in the frequency domain of the image. Other frequency based or spatial denoising filters may also be used. A key limitation of Eq. (1) is that the SNP is highly contaminated by the details from the scene. The extent of this limitation is apparent in FIGS. 3 (a), (b) and (c).

Figure 3:
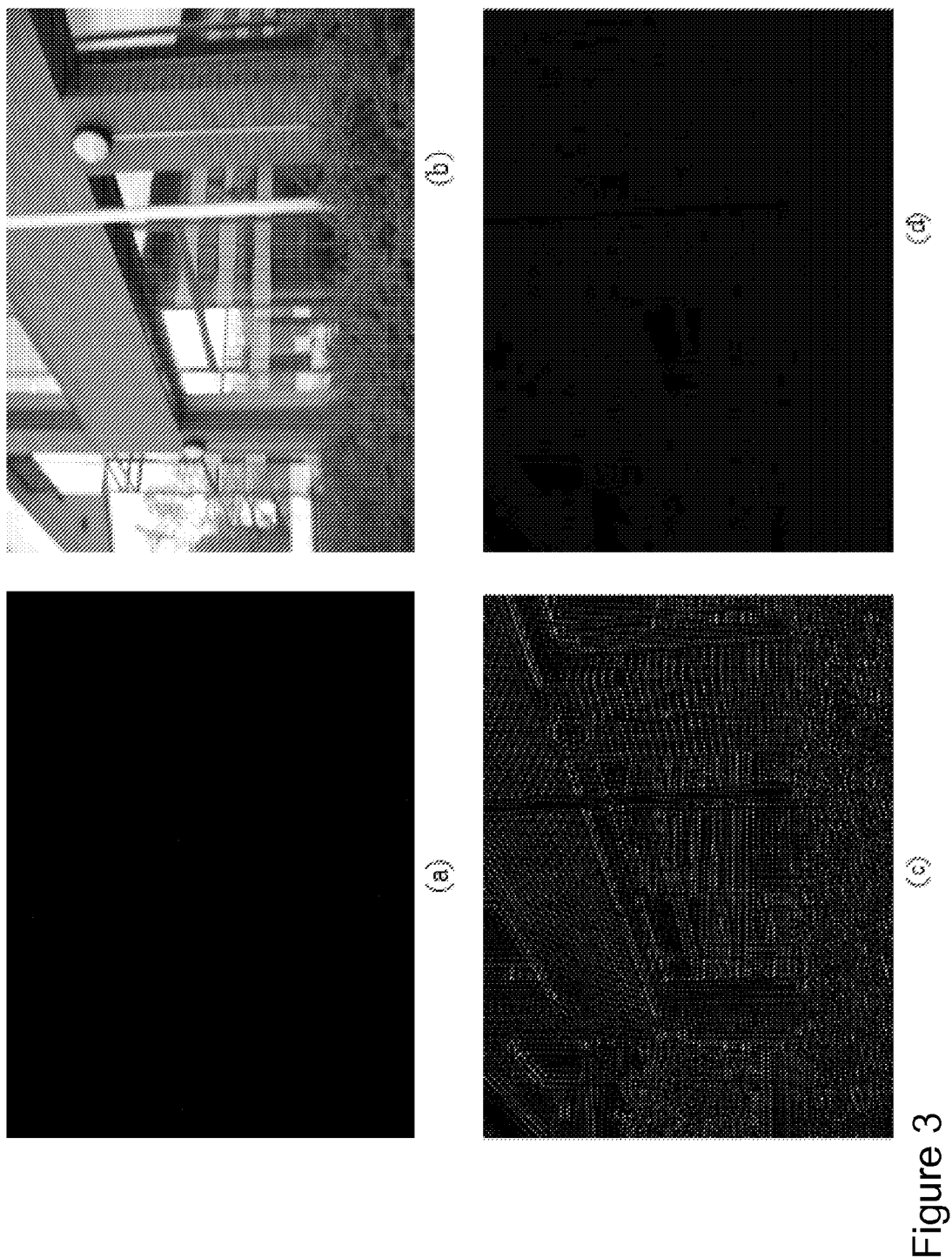
FIG. 3 shows an example of the extraction of an image fingerprint.

FIG. 3(a) shows the reference SNP taken from a camera using the average SNP of 50 images taken of a blue sky, FIG. 3(b) shows a natural scene taken using the same camera and FIG. 3 (c), the SNP extracted from FIG. 3 (b) using the method of WO/2007/094856. FIG. 3(d) shows the enhanced SNP extracted from FIG. 3(b).

Multiple images of blue sky, or any other sets images of flat featureless surfaces, are ideal as they provide flat images with low signal variation, making SNP extraction a relatively trivial task. However, most images contain detail which is more difficult to extract. In FIG. 3(b) this detail is present in the form of a building. It is immediately apparent in FIG. 3 (c) that the extracted SNP is highly contaminated by the original signal in the relatively banal image shown in FIG. 3 (b). Therefore, it is clear that the initial extraction of the SNP at step S104 does not provide a sufficiently "clean" SNP from which an accurate comparative measure may be made.

Therefore, unless the image only contains a featureless low noise variation e.g. a blue sky or a white wall, the initial SNP is of limited use as the contaminants from the scene dominate the SNP. Additionally, even for featureless images several images are required to be averaged to produce an uncontaminated SNP. This is of limited practical value as such images are not routinely taken.

Therefore, it is necessary to manipulate the initial SNP to obtain an enhanced SNP which occurs at step S106. The key factor of this process is the realisation that in the vast majority of images where there is some form of detail present, the stronger a SNP component in n is, the less trustworthy the component should be. An enhanced fingerprint $n_e$ can therefore be obtained by assigning weighting factors that are inversely proportional to the magnitude of the initially extracted SNP component.

The invention can use a number of different models to filter the image, whose functions are based on the above premise. In the preferred embodiment in conjunction with the wavelet based denoising filter, the following five models are used as these are found to be the most effective:

$$\text{Model 1: } n_e(x, y) = \begin{cases} e^{-0.5\frac{n^2(x,y)}{\alpha^2}}, & \text{if } 0 \le n(x, y) \\ -e^{-0.5\frac{n^2(x,y)}{\alpha^2}}, & \text{otherwise} \end{cases} \quad (2)$$

$$\text{Model 2: } n_e(x, y) = \begin{cases} 1 - \frac{n(x, y)}{\alpha}, & \text{if } 0 \le n(x, y) \le \alpha \\ -1 - \frac{n(x, y)}{\alpha}, & \text{if } -\alpha \le n(x, y) < 0 \\ 0, & \text{otherwise} \end{cases} \quad (3)$$

$$\text{Model 3: } n_e(x, y) = \begin{cases} 1 - e^{-n(x,y)}, & \text{if } 0 \le n(x, y) \le \alpha \\ (1 - e^{-\alpha}) \cdot e^{\alpha - n(x,y)}, & n(x, y) > \alpha \\ -1 + e^{n(x,y)}, & \text{if } -\alpha \le n(x, y) < 0 \\ (-1 + e^{-\alpha}) \cdot e^{\alpha + n(x,y)}, & \text{if } n(x, y) < -\alpha \end{cases} \quad (4)$$

$$\text{Model 4: } n_e(x, y) = \begin{cases} \frac{n(x, y)}{\alpha}, & \text{if } 0 \le n(x, y) \le \alpha \\ e^{-0.5\frac{(n(x,y)-\alpha)^2}{\alpha^2}}, & \text{if } n(x, y) > \alpha \\ \frac{n(x, y)}{\alpha}, & \text{if } -\alpha \le n(x, y) < 0 \\ -e^{-0.5\frac{(n(x,y)+\alpha)^2}{\alpha^2}}, & \text{if } n(x, y) < -\alpha \end{cases} \quad (5)$$

$$\text{Model 5: } n_e(x, y) = \begin{cases} \frac{n(x, y)}{\alpha}, & \text{if } 0 \le n(x, y) \le \alpha \\ e^{\alpha - n(x,y)}, & \text{if } n(x, y) > \alpha \\ \frac{n(x, y)}{\alpha}, & \text{if } -\alpha \le n(x, y) < 0 \\ -e^{\alpha + n(x,y)}, & \text{if } n(x, y) < -\alpha \end{cases} \quad (6)$$

where n(x,y) and $n_e$(x,y) are the (x,y)th component of n and $n_e$, respectively and $\alpha$ is a scaling factor which determines the scaling rate as the models are not linear. It is empirically observed that $\alpha=7$ is the optimal value for all the five models. In the preferred embodiment the default setting is for Model 1 (as defined by Eq. 2) with $\alpha=7$, though other models, including those not listed, and other values of $\alpha$ may also be used.

Figure 4:
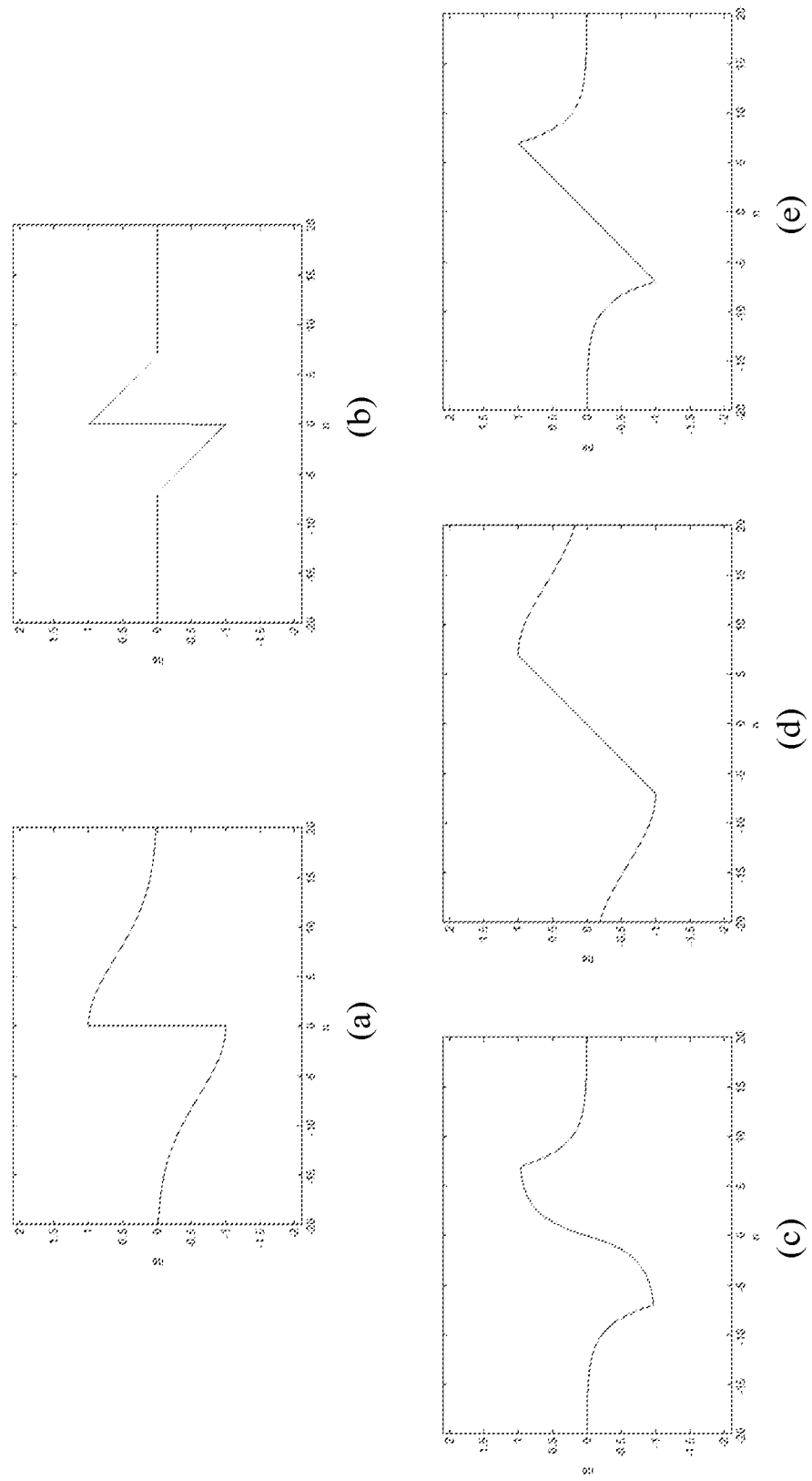
FIG. 4 the functions of the models.

The function of the five models are shown graphically in FIG. 4 (a) to (e) which shows Models 1 to 5 respectively. The horizontal and vertical axes represent the contaminated fingerprint n and the enhanced fingerprint $n_e$, respectively. All five models follow the basic premise that the initial SNP is weighted by an inverse function.

Models 1 and 2 allow the magnitude of $n_e$, (i.e., $|n_e|$) to decrease monotonically with respect to the magnitude of n. Models 3, 4 and 5 allow the magnitude of $n_e$, (i.e., $|n_e|$) to grow monotonically in accordance with the magnitude of n (i.e., $|n|$) if $|n| \le \alpha$ and to decrease monotonically and rapidly with respect to $|n|$ if $|n| > \alpha$. From Eq. (2)–(3) and FIG. 4(a)-(b) we can see that a determines the decreasing rate. In Eq. (3)–(6) and FIG. 4(c)-(e)$\alpha$ determines the point where the magnitude of $n_e$ (i,j) start decreasing and the increasing and decreasing rate before and after $\alpha$.

FIG. 3(d) shows the enhanced SNP extracted from FIG. 3(b) by applying model 1 with $\alpha=7$ to the initial SNP as shown in FIG. 3(c). It is immediately apparent that the contamination seen in FIG. 3(c) has been removed. A further advantage of the use of a model to enhance the SNP is that an uncontaminated SNP can be extracted from a single image.

The implementation of the wavelet denoising filter and enhancing the SNP by the use of the models is performed using known computing methods for image manipulation.

In an embodiment of the invention, the initial SNP and an enhanced SNP for a given image are stored, preferably in a database 4, with metadata detailing the parent image from which they were extracted so that the parent image may be identified.

In an embodiment of the invention the SNP for each image is compared so that identical or similar SNPs may be identified.

The SNP for a given device, say a digital camera, is stable and therefore will not change significantly over time. Therefore, all images taken with the same device will have substantially the same SNP, thereby allowing images taken with the same device to be identified via their SNP. In order to identify images with the same SNP a similarity measure is required. A similarity measure is measured by a similarity metric as defined in Equation 7 to quantify the difference in an extracted enhanced SNP against a given reference SNP. A single SNP, or multiple SNPs, may be used as the reference SNPs, with a similarity measure for each SNP would be obtained. This score is preferably stored in a database 4 with metadata associating it with the originating image and enhanced SNPs.

To identify the source imaging device that has taken image I under investigation from D devices, we use the correlation $\rho_d$, as formulated in Equation 7, between the enhanced sensor noise pattern $n_e$ of image I and the reference SNP, $P_d$, of device d, d∈{1, 2, ..., D}, as a similarity metric.

$$\rho_d = \frac{(n_e - \bar{n}_e) \cdot (P_d - \bar{P}_d)}{\|n_e - \bar{n}_e\| \cdot \|P_d - \bar{P}_d\|} \quad (7)$$

where $\bar{n}_e$ and $\bar{P}_d$ are the means of $n_e$ and $P_d$, respectively. The larger the value of $\rho_d$ the higher the likelihood that a given image I was taken by a given device d. In the case where d>1, the device d that yields highest correlation $\rho_d$ is identified as the device that has taken image I, if $\rho_d$ is greater than a threshold t set by the user i.e., $$d^* = \underset{d}{\mathrm{argmax}}(\rho_d \mid d \in \{1, 2, \ldots, D\}).$$

Otherwise, the identifier should report that the image is taken by an unknown device. It is noted that a value of t=0.01 is found to produce an accurate match. The similarity metric may be performed by comparing the entire image or the same subsection of two or more images.

In an embodiment of the invention, the above described technique is used to determine if two or more images originated from the same camera, where neither the host camera, nor the host camera's SNP are available. The enhance sensor noise pattern n for the images to be compared are extracted using the methods described above. Once extracted the similarity of the enhanced sensor noise patterns is determined. If two images i, j are being compared, then the similarity $\rho(i,j)$ may be expressed as:

$$\rho(i,j) = \frac{(n_i - \bar{n}_i) \cdot (n_j - \bar{n}_j)}{\|n_i - \bar{n}_i\| \cdot \|n_j - \bar{n}_j\|} \quad (8)$$

where $\bar{n}_i$ and $\bar{n}_j$ are the means of enhanced sensor noise patterns $n_i$ and $n_j$, respectively.

If the similarity $\rho(i,j)$ is found to be above a threshold t set by the user, the user can conclude that the two images are taken by the same device, i.e., link the two images to the same source device. Otherwise, they are taken by different devices. As previously, it is found that a value of t=0.01 is sufficiently accurate.

The time taken for the similarity metric to be calculated is clearly dependent on the size of the image used, and the number of reference devices D for which there is an SNP, or the number of photos against which an initial photo is compared in order to determine if the photos originate from the same device. This can quickly become prohibitively expensive in terms of number of computations for large images and or a large reference data set D. The size of the similarity metric is also dependent on the dimensions of the images used, e.g. 1024*2048 pixels, and therefore can rapidly become unacceptably large in terms of memory and storage requirements.

In Forensic analysis the numbers of images that form a dataset may be many thousand and therefore performing the similarity calculation for all reference devices may become unfeasible.

Therefore, it is not desirable to obtain a similarity measure for all images, nor is it desirable to use the whole of the image. The present invention therefore also provides an optimised method of classifying images according to their SNP.

There is provided a method of overcoming this problem with an unsupervised digital image classification method.

Additionally, images may be cropped or rotated before they are released. The similarity metric as described above requires the same subsection of two or images to be compared or else a match will not be returned even if they have identical SNPs (as the comparison would be between different areas of an SNP which are unlikely to be the same).

Therefore, there is also a need to be able to compensate for potential manipulation of the image.

Figure 5:
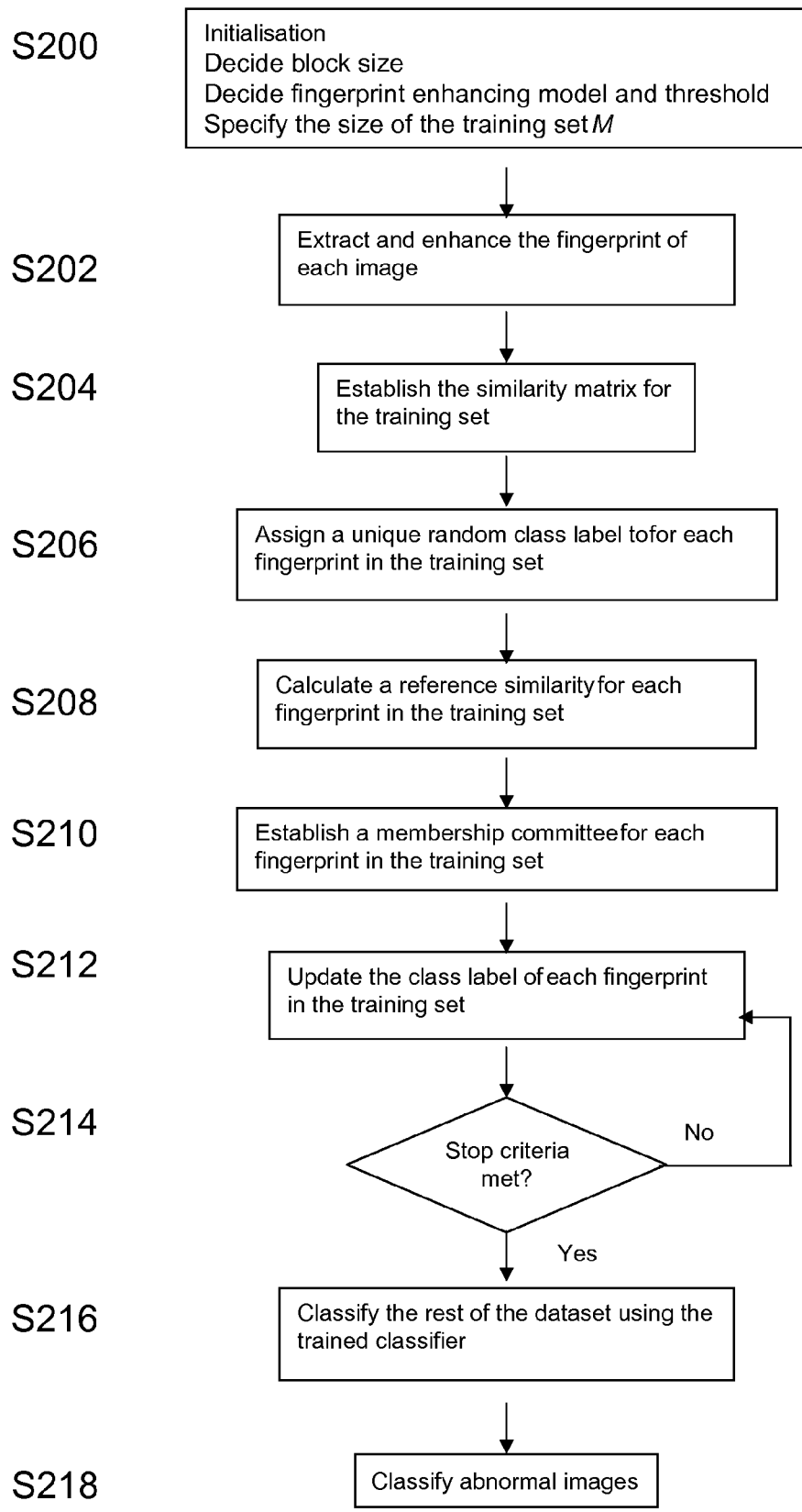
FIG. 5 is a flow chart of the processes of classifying a large number of images according to their SNP according to another aspect of the invention.

FIG. 5 shows a flow process of the invention including the steps of classifying the images according to the preferred embodiment.

There is shown the step of initialisation of the dataset at step S200, extraction and enhancement of the SNP at step S202, establishing a similarity matrix for a training set at step S204, assigning a random class label at step S206, calculating a reference similarity at step S208, establishing membership criteria at step S210, updating class labels at step S212, determining if stop criteria has been met at step S214, classifying the remaining images in a dataset using the trained classifier at step S216 and classifying any abnormal photos at step S218.

The above steps may be broadly classified as four separate modules: digital fingerprint extraction and enhancement, similarity measurement of the images of the training set, classifier training and image clustering. The purposes of each module are described as follows.

Digital fingerprint extraction and enhancement: This is as described above.

Similarity measurement of the images of the training set: Given the unacceptably large costs in terms of computation and storage that would occur when using the full dataset (potentially containing thousands or millions of images), a training set is established which is representative of the total set. Analysis is performed on this training set to provide the ensuing classifier training module an M×M similarity matrix $\rho$, with element $\rho(i,j)$ indicating the similarity between SNPs i and j. Where M is the number of images used to form the training set.

Classifier training: The training set is used to determine potential membership classes and the criteria for these classes. Once determined, the similarity comparison need only be performed against each class and not all the images. This allows for the reduction of the number of comparisons that need to be made in order to identify the originating device.

The classifier training module, in the preferred embodiment, takes a small sub-set of the images of the entire dataset at random and assigns them a number of classes according to the similarity provided by the previous sub-task. Each class corresponds to one imaging device (known or unknown), and a centroid of each class is then calculated. The centroid is equivalent to the "average" SNP for that class.

In the preferred embodiment the number of classes is inferred and the class assignments is made adaptively without the user providing a threshold. This allows for the unsupervised classification of the images. In further embodiments the user sets thresholds to classify images. This may occur, for example, where the user is aware of the originating device and can cluster a number of images taken from that device, thereby avoiding the need to define a class or device assignment. However, in practice such a situation is rare and therefore an unsupervised definition of the classes is preferred as it also removes any user biases, which are often unquantifiable, that occur.

The entire dataset can be provided to this module so that the next image clustering module can be excluded. However, doing so incurs unacceptable memory space for storing the similarity matrix and computational cost when the dataset is large. The size of the training set depends on the size of and the anticipated diversity of the entire dataset. Therefore no theoretical backing for determining the size of the training set is available, though it is found that a training set of 300 regardless of size of the actual set (assuming naturally the data set is larger than 300) is sufficient.

Image clustering: Given the class centroids provided by the classifier trainer, this module is to assign each image's SNP i in the non-training set to a class with the centroid most similar to i's SNP. As discussed previously it is immediately apparent that by training the classifier with a sample of the entire image dataset the number of calculations required, and therefore computational requirements, are greatly reduced.

In order to compensate for the potentially random orientation of the images, the following embodiment describes a method to overcome this problem. The system is initialised at step S200 where the parameters of the system are determined.

It is known for most photos to be taken with detectors that contain dimensions of $2^n$ pixels e.g. 256, 512, 1024 etc. or produce images known image dimensions e.g. 4288×2848, 2544×1696, 1728×1152 pixels etc. This dimensions change between make and model of camera, but cameras of the same make and model (sometimes several models) have the same image dimensions. In an embodiment of the invention images that do not conform to these known dimensions or are of a different size are flagged and removed from the dataset. Due to their non-standard features, and in order to increase the efficiency of the invention these are considered separately, at the end of the process at step S218.

Optionally, the user of the invention may specify information to reduce the data set of images to be processed or potentially increase the likely matches. If in an investigation it was known that pictures were taken at a particular time and/or date, then in order to reduce the size of the data set to be processed the metadata that is present in images may be used appropriately to find associated data within the data set. Metadata on a typical photo will comprise information such as a time, date and camera identifiers, though this information is not always present or may be subverted. By reading this metadata, it is possible to filter photos by such information stored in the metadata. This may include, the time, date, camera make or model or combinations of this data.

In another embodiment, the photos may be tagged with one or more keywords to describe the content of the photo. This information is preferably stored in the database 4 along with a reference to the originating photo. This key words may be for example "building", "aeroplane", "crowd", "bus station", "child", "football match" etc. During the initialising stage, the images to be identified may be selected by these keywords. The tags used need not be general terms but may also be specific e.g. a car license plate, an individual person etc.

In a further embodiment, the images may be identified using known scene or facial recognition software to automatically assign tags that relate to the scene.

Clearly, such filtering is advantageous to reduce the data set and therefore the computer time required to analysis the data set.

Preferably, images from cameras that are identified as being of the same make and model are processed together as it is more likely to matches from these subsets than say a match for an image taken with by two different brands of camera. Further reductions in the data set may occur by only searching for image sizes supported a camera. e.g. only analysing images that are 4288×2848 which are typical of say a Sony™ digital camera and ignoring images that are say 3872×2592 pixels, as may be found on say a Pentax™ camera.

However, as the metadata may be changed with relative ease, it is possible that images that have identical metadata, purporting to originate from the same device may in fact originate from different devices. The present invention is able to identify such cases as the SNPs for these images would not match.

As digital images, in general, are rectangular in dimension the degeneracy in the number of possible relative orientations of the SNP is two (i.e. it is impossible to tell if the SNP of an image is the "right way up" or "upside down" for a given orientation). An initialising step is therefore, to orientate all images so that horizontal axis is the longest. Horizontally oriented images are left intact and the vertically oriented images are turned 90 degree clockwise. This set is called DATASET 1, including those which are left intact. DATASET 2 is then created by rotating each image in DATASET 1 by 180 degree. Whilst this increases the number of images in the dataset it also ensures that images with the same SNP will be guaranteed to have an SNP that is orientated in the same relative direction.

Once the two datasets are created the fingerprint extraction can begin. However, as mentioned previously it is undesirable to perform this extraction of the whole image and on the whole dataset. Therefore, a small subsection of each image is used in the classification process. The subsection to be sampled is taken from the same place in each picture, for ease this is taken to be the centre of the image, as it is found that the centre of the image is less likely to be saturated thereby allowing the extraction of the SNP, though any subsection may be sampled. It is found that a block size of greater than or equal to 256×512 pixels (or 512×256) is large enough to provide a sufficient sample of a given SNP to be able to determine if a match is present to a high degree of confidence. Larger block sizes are indeed preferable but also result in an increase in the computational requirements.

Further initialising steps include the selection of the enhancing model and the value of $\alpha$ used. As discussed with respect to FIG. 2 the preferred model is model 1 as defined by equation 2 and a value of $\alpha=7$.

The step of selecting the subset of images from the dataset to be used as the training set is also performed at this stage. The size of the training set is M images, where M may be specified by the user or taken as a pre-set number. The value of M depends on the size of and the anticipated diversity of the entire dataset. Therefore, no theoretical backing for determining the size of the training set is available. If M is set by the user the computing resource and time constraints should be considered. Moreover, since there is no ground truth in real forensic cases, therefore a good practice to ensure that the classifier provides "accurate" result is to execute the classifier multiple times and verify the consistency of the results. It is found that approximately 300 images forms a sufficiently diverse sample for a given image set.

Once the system is initialised at step S200, the SNP for the all M images of the training set is extracted at step S202. The extraction and enhancing of the SNP occurs as described previously with reference to FIG. 2. The extraction only occurs for the subsection of the images as defined in step S200 (e.g. the 256×512 block in the top left corner of all images). This reduces the number of calculations required to extract and enhance the SNP, thereby reducing computational requirements.

Once all the enhanced SNPs have been extracted for all M images of the training set, the similarity of the SNPs in the training set is determined at step S204. The similarity between any two enhanced digital fingerprints i and j is calculated using a slightly modified version of Equation (7).

$$\rho(i, j) = \frac{(n_i - \bar{n}_i) \cdot (n_j - \bar{n}_j)}{\|n_i - \bar{n}_i\| \cdot \|n_j - \bar{n}_j\|}, \, i, j \in \{1, 2, 3, \ldots, M\} \quad (8)$$

As the value is frequently reused and during the ensuing classifier training stage, to reduce computational cost, an M×M similarity matrix $\rho$, is established. Element $\rho(i,j)$ therefore indicates the similarity between fingerprints i and j. This matrix is stored and thus the matrix $\rho$ can be queried at element $\rho(i, j)$ for future references of the similarity between SNPs i and j thereby avoiding the need for repeated calculation.

In order to overcome the random orientation problem to calculate the similarity between two images i and j, four combinations need to be taken into account (i.e. (i of DATASET 1, j of DATASET 1), (i of DATASET 1, j of DATASET 2), (i of DATASET 2, j of DATASET 1) and (i of DATASET 2, j of DATASET 2)). Therefore the invention calculates the similarity for each combination and takes the maximum (i.e. the most likely match) of the four similarity values as the (i, j)th and (j, i)th element of the similarity matrix.

Once the matrix $\rho$ has been calculated the invention commences the classifier training module. The purpose of the classifier is to assign each image of the training set into an optimal class based on the similarity measurement as calculated in step S204. Formally this may be expressed as if there are K classes of images in the training set, with the value of K unknown. Denote D={$d_k$|k=1, 2, . . . , K} as the set of class labels and $f_i$, $f_i \in$D, as the class label/class membership of SNP i. The objective of the classifier trainer is to assign an optimal class label $d_k$ to each SNP i, in an iterative manner until a set of stop criteria are met.

The first step is to assign a unique class label for each SNP at step S206. For example, if the training set consists of 300 images 300 different class labels would be required. Formally, K, is unknown, and therefore each fingerprint i is treated as a singleton class (i.e., assume that K=M), with each assigned a unique class label (i.e., $f_i$=$d_i$, i∈{1, 2, 3, . . . , M}). Thus, the starting condition is that there a M singleton clusters, where M is the size of the training set. At step S208 a reference similarity is calculated for each SNP. Whilst there are K unknown classes (or devices) in a set it is possible to determine the probable number of devices, or value of K using the following premise. The similarity between fingerprints of the same class (the intra-class similarity) is expected to be greater than the similarity between fingerprints of different classes (the inter-class similarity). For each SNP i, using a known k-means algorithm the M−1 similarity values between i and the rest of the training set are clustered into two groups, an intra-class and inter-class group. The separation of the average centroids for the two clusters, as defined by the k-means algorithm, is calculated and stored as the reference similarity, $r_i$. Although the similarity values are both scene- and device-dependent, the step of enhancing the SNP S202, reduces this dependency. For a given SNP i, its reference similarity $r_i$ may be used to distinguish between intra and inter class members. It is found that most intra-class similarity values are greater than $r_i$ while most inter-class similarity values are less than $r_i$.

At step S210 a membership committee $C_i$ for each SNP i in the training set is established. The membership committee contains the SNPs that are the most similar i.e. have the highest similarity measure as calculated at step S204, to an SNP i. The size of the committee, i.e. the number of similar SNPs that are chosen, can be M−1 or a subset of the training set. In the preferred embodiment a subset of the training set is chosen i.e. $C_i$<M−1, though a value of $C_i$=M−1 may be used.

During the first iteration each SNP i, is still assigned with the unique class label from step S206. The class labels of the membership committee $C_i$ are used to define a new label for the committee. Therefore a high value of $C_i$ is potentially computationally expensive and therefore a subset is preferred.

Once the committee $C_i$ for each SNP i, has been established the class label $f_i$ is updated at step S212. The following process will allow groups that have similar SNPs to be identified and assigned the same class label.

For each SNP i, a cost, $p_i(l)$ (defined below) is calculated for each committee member j, of $C_i$ (i.e., j∈$C_i$). The cost is the cost of each class label $f_j$ for each member j. Therefore, if $C_i$ is large the computation cost is high and thus in the preferred embodiment $C_i$<M at step S210. Once all costs for the class labels $f_j$ have been calculated the class label with the lowest associated cost $f_{j(lowest\ cost)}$ for the committee is determined. The originally assigned class label $f_i$ is then updated with the value of $f_{j(lowest\ cost)}$. This process is repeated for all SNPs that is to say all j.

Let L denote the number of class labels currently assigned to the members of $C_i$ and i itself (i.e., L={l|l∈{{$f_i$}∪{$f_j$|j∈$C_i$}}}. The cost, $p_i(l)$, is defined as $$p_i(l) = \sum_j^c s(l, j) \cdot [\rho(i, j) - r_i], \quad (9)$$

where $\rho(i, j)$ is the similarity (as defined in Equation (8)) between i and the jth member of $C_i$, $r_i$ is the reference similarity (as calculated at step S208), c is the number of members of $C_i$ and s(l, j) is a sign function define as $$s(l, j) = \begin{cases} +1, & \text{if } l \neq f_j \\ -1, & \text{if } l = f_j \end{cases}, \quad (10)$$

where l is an arbitrary class label in L with its cost being calculated and $f_j$ is the class label of the jth member in $C_i$. From Eq. (9) and (10) we can see that When $\rho(i, j)$>$r_i$, $\rho(i, j)$ is an intra-class similarity value and fingerprints i and j are expected to belong to the same class and represents the case where it might be expected that the SNPs originate from the same device. In this case a) If class label $l \neq f_j$, which is inconsistent with the expectation, the value of $s(l, j)=1$ would result in a positive value (i.e., penalty) added to the cost $p_i(l)$.
b) If class label $l=f_j$, which is consistent with the expectation, the value of $s(l, j)=-1$ would result in a negative value (i.e., gain) added to the cost $p_i(l)$.

When $\rho(i, j) < r_i$, $\rho(i, j)$ is an inter-class similarity value and fingerprints i and j are expected to belong to different classes. In this case c) If class label $l \neq f_j$, which is consistent with the expectation, the value of $s(l, j)=1$ would result in a negative value (i.e., gain) added to the cost $p_i(l)$.
d) If class label $l=f_j$, which is inconsistent with the expectation, the value of $s(l, j)=-1$ would result in a positive value (i.e., penalty) added to the cost $p_i(l)$.

The skilled man would understand that step S212 for each SNP i, identifies the SNPs as determined by their similarity score. Step 212 therefore clusters similar SNPs together, eventually allowing for the identification of images that originated from the same device by virtue of each member of the cluster having the same class label.

Once step S212 has been performed all SNP i, the invention checks to see if the stop criterion has been met at step S214. The stop criterion in the preferred embodiment is when there are no changes of class labels to any fingerprint in x consecutive iterations. It is found that when using a training set of M=300 fingerprints setting x=1 is enough. Clearly on the first pass of step S212 this criterion will not be met and therefore step S212 is performed.

Those skilled in the art will understand that upon each successive pass of step S212 that clusters of similar SNPs will form and will be given identified as having the same class label (which would be $f_{j(lowest\ cost)}$). A visual representation of the clustering and classifying step is shown in FIGS. 6 and 7.

Figure 6:
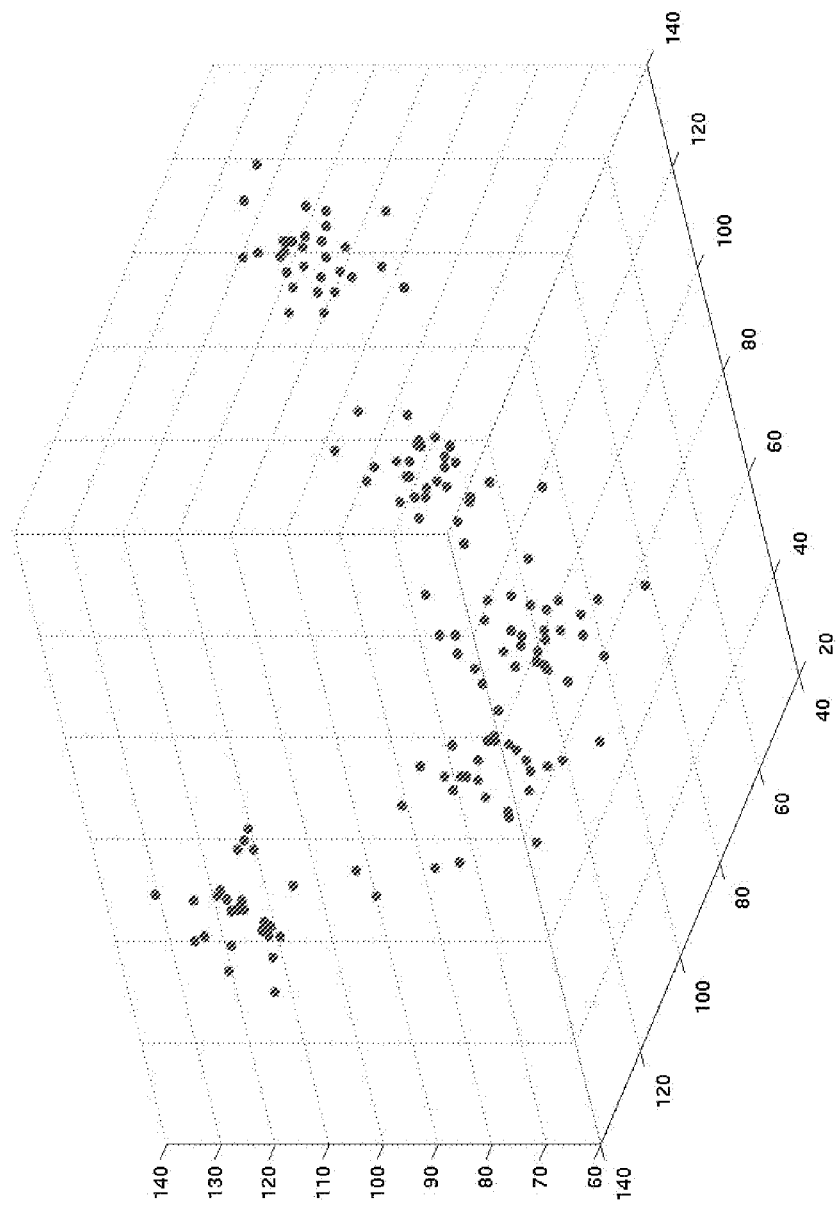
FIG. 6 shows an example of a population of unclassified fingerprints.

FIG. 6 shows a synthetic dataset of 150 data points. There is shown the synthetic data points plotted on an arbitrary three dimensional axis.

The data dimensions of the similarity metric are determined by the size of the data block used to extract the SNP as defined in the initialising step S200 e.g. 256×512 which cannot be represented in 2-D. Therefore, a synthetic plot is used to illustrate the clustering techniques used. As can be seen from FIG. 6 there are some clusters of data points which may be identified by eye. However, such identification results in undesirable and unquantifiable biases. Steps S212 and S214 provide an unbiased method of identifying clusters.

Figure 7:
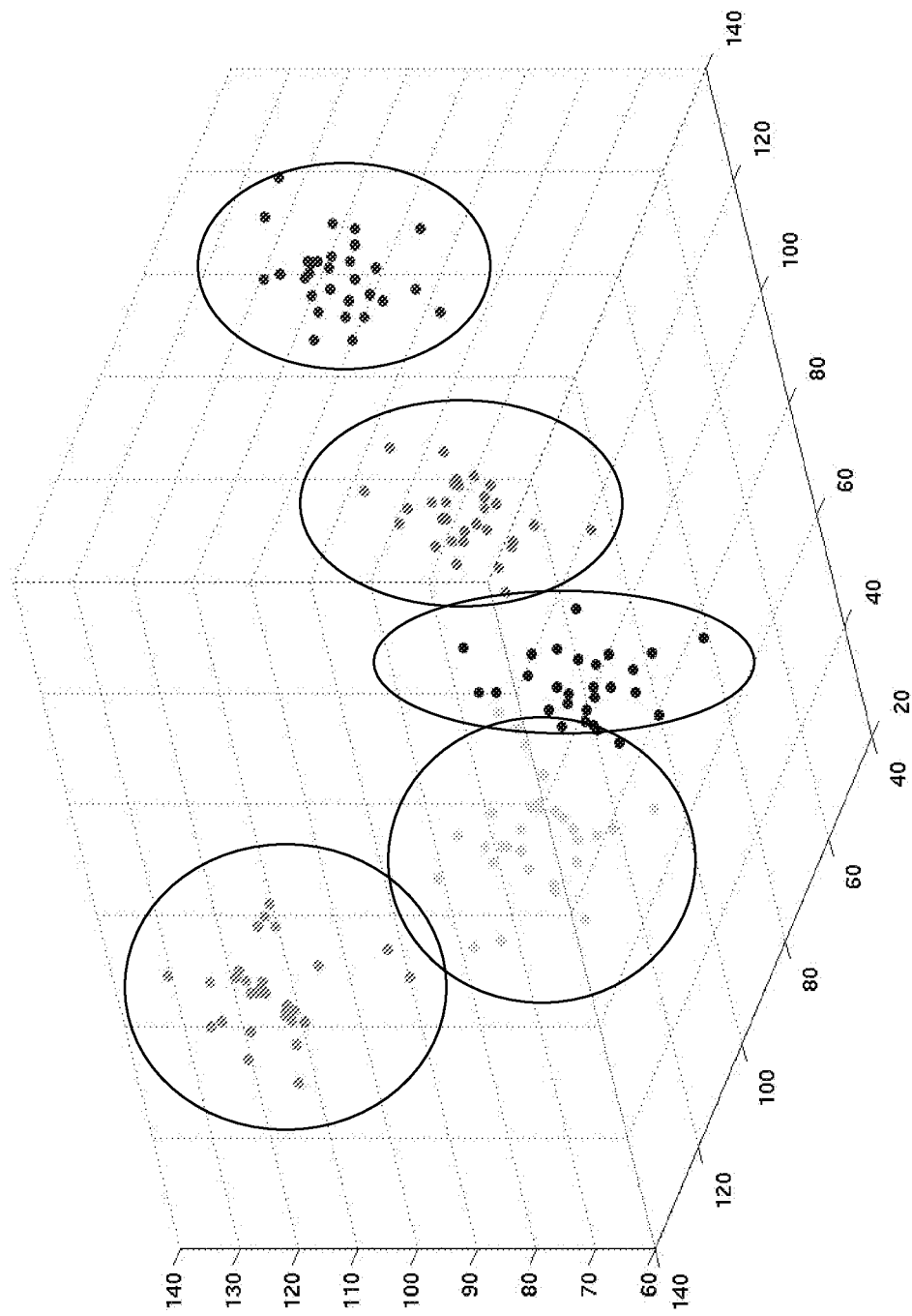
FIG. 7 shows the classified fingerprints of FIG. 6.

FIG. 7 shows the same data set as in FIG. 6 where the invention has classified the data and assigned class labels to the clusters according to the method described above. Points which share the same class labels are circled.

Once the iterative process of steps S212 and S214 have met the desired criteria, the stage of training the classifier has been completed. With the trained classifier the remaining images that did not form part of the training set may be classified using the trained classifier at step S216.

The centroids of the clusters (as identified as having the same class label) are calculated and these centroids are used to classify the remaining images that did not form the training set. The enhanced SNP for these images has already been extracted at step S202. Each image will have two SNPs to overcome the orientation problem described earlier. To classify an SNP i, we compare the similarity of its two fingerprints (one associate with DATASET 1 and the other with DATASET 2) to each centroid of the clusters as identified in the trained classifier. The similarity is calculated as described previously according to Equation (8). This returns two similarity values for each SNP (one for each orientation), the greater of the two values (i.e. the most similar) is retained. Once the similarity measure for each cluster has been determined the SNP i, is assigned to the cluster with the highest similarity measure.

During the image clustering process, the centroids of the classifier can either be fixed throughout the entire process or updated when new images are assigned the corresponding classes. The update is accomplished by recalculating the average fingerprint of the classes which take in new members. The update operation has a negative impact on the efficiency of the classifier without necessarily improving classification accuracy. It is found that there is no need to update the centroid of classes with more than 20 members.

The invention is advantageously able to identify new clusters in the preferred embodiment. If the similarity between a fingerprint and most similar centroid is less than a threshold set by the user, a new class with the fingerprint as the founding member is created and allowed to attract new members just like the classes identified by the trainer. Therefore, even if the training set does not contain images which originate from the device of the new founding member it will be identified as a new device. This adaptability therefore allows the present invention to work successfully without knowledge of the devices of indeed the number of devices that are present. This is particularly advantageous in the application of digital forensics where little or no knowledge of the devices is known.

Those skilled in the art will also realise that the above process allows for the unsupervised classification without the user specifying/guessing the similarity threshold $r_i$ and the number of classes K as:

The fact that, for each fingerprint, the similarity values between it and the rest of the training set can be grouped into intra-class and inter-class as described in Step S208 facilitates adaptive determination of $r_i$ automatically by the trainer. This adaptivity also makes the classifier applicable to new databases without tuning any parameters.

The trainer starts with a class label space/set as big as the training set (i.e., the worse case with each fingerprint as a singleton class) and the most similar fingerprints are always kept in i's membership committee $C_i$ so the classes can merge and converge quickly to a certain number of final clusters in a few iterations. The term $\rho(i, j)-r_i$ in Eq. (9) also provides adaptivity and helps the trainer to converge because it gives the fingerprints with the similarity value $\rho(l, j)$ farther away from the reference similarity $r_i$ more say in determining the class label for the fingerprint in question. That is to say Eq. (9) allows the trainer to exploit the power of the discriminative/influential fingerprints and maintain high degree of immunity to errors due to the less discriminative ones.

Once the remaining images have classified using the trained classifier at step S216 the invention considers the images that were considered "abnormal" during the initialisation step S200.

These special cases are advantageously considered at step S218 as it allows for all the clusters identified during steps S212 and S216 to be used to determine their likely origin. Additionally, due to the high computational costs associated with these step it is desirable to be able to avoid performing this step as few times as possible. Therefore, whilst analysis for the abnormal photos may occur alongside analysis of all other photos it is more efficient to do so only after all, or the majority, of photos have been analysed.

As the objective is to determine which class these abnormal cases belong to it is clearly more efficient to perform this step once all the classes have been identified. However, a problem is that as these abnormal images are often cropped there is no guarantee that the area sampled for the SNP will be present in the image. Therefore, the entire SNP for each cluster (which is equivalent to a device) must be extracted. This may be taken as the average SNP for all SNPs that form a cluster, or for a sample of each cluster e.g. a maximum of 20 SNPs per cluster may be used to determine the average SNP for the cluster.

The SNP for the abnormal image is extracted using the previously explained method. As the image has been in some-way manipulated it is unknown which part of the image is present e.g. has the image been cut from the centre, the top left edge, the bottom right edge etc. The invention samples the SNP of the averaged cluster SNP in blocks the size of the abnormal image across a number of different parts of the image. These samples of the average SNP and the extracted SNP for the abnormal image are compared as described for the standard images at step S204 using the similarity matrix. The highest similarity score represents the closest match, and therefore the most likely overlap. If desired the coordinates of the block with the highest similarity score are used as the starting point to further sample the average SNP to try and improve the overlap match. This process is repeated for the average SNP for each cluster. The cluster with the highest similarity score would therefore represent the best match or if the match level is below a threshold represent a potential new cluster as described in step S216. Clearly, these special cases require many more calculations as the similarity measurements must be performed for each cluster and a number of positions for each individual cluster.

As scaling an image e.g. the magnification or shrinking of an image, will affect the SNP, images that originate from the same device, and have been scaled in some way, will not be present in the same cluster as images from the same device that have not been scaled due to the differences in their SNPs. Images from the same device, which have been scaled in the same way, will be identified as a cluster as they will have similar SNPs.

Whilst the preferred embodiment has been described with particular reference to Equations 1 to 9, it should be noted that equations that of a similar function but of a different form may also be used without deviating from the concept of the invention.

It is immediately apparent to the skilled man, that whilst this invention has been described as a method that is able to identify images that were taken by the same device were there are an unknown number of originating devices, that the present invention is able to identify which device an image came from if the SNP for that device was available.

The invention claimed is:

1. A method of identifying an image capture device based on an enhanced Sensor Noise Pattern extracted from an image under investigation, the method comprising the steps of:
   extracting an initial Sensor Noise Pattern (SNP) for the image under investigation;
   enhancing the initial SNP to create an enhanced SNP by applying a correcting model, wherein the correcting model scales the initial SNP by a factor which is an inverse function of the magnitude of the signal intensity of the initial SNP;
   determining a similarity measure between the enhanced SNP for said image with one or more previously calculated enhanced SNPs for one or more image capture devices; and
   identify the image capture device with its reference enhanced SNP most similar or identical to enhanced SNP of the image under investigation based on the determined similarity measure.

2. The method of claim 1 wherein the initial SNP is identified with a wavelet based de-noising filter.

3. The method of claim 2 wherein the correcting model is one or more of the following functions:

$$\text{Model 1: } n_e(i, j) = \begin{cases} e^{-0.5\frac{n^2(i,j)}{\alpha^2}}, & \text{if } 0 \leq n(i, j) \\ -e^{-0.5\frac{n^2(i,j)}{\alpha^2}}, & \text{otherwise} \end{cases}$$

$$\text{Model 2: } n_e(i, j) = \begin{cases} 1 - \frac{n(i, j)}{\alpha}, & \text{if } 0 \leq n(i, j) \leq \alpha \\ -1 - \frac{n(i, j)}{\alpha}, & \text{if } -\alpha \leq n(i, j) < 0 \\ 0, & \text{otherwise} \end{cases}$$

$$\text{Model 3: } n_e(i, j) = \begin{cases} 1 - e^{-n(i,j)}, & \text{if } 0 \leq n(i, j) \leq \alpha \\ (1 - e^{-\alpha}) \cdot e^{\alpha - n(i,j)}, & n(i, j) > \alpha \\ -1 + e^{n(i,j)}, & \text{if } -\alpha \leq n(i, j) < 0 \\ (-1 + e^{-\alpha}) \cdot e^{\alpha + n(i,j)}, & \text{if } n(i, j) < -\alpha \end{cases}$$

$$\text{Model 4: } n_e(i, j) = \begin{cases} \frac{n(i, j)}{\alpha} & \text{if } 0 \leq n(i, j) \leq \alpha \\ e^{-0.5\frac{(n(i,j)-\alpha)^2}{\alpha^2}}, & \text{if } n(i, j) > \alpha \\ \frac{n(i, j)}{\alpha}, & \text{if } -\alpha \leq n(i, j) < 0 \\ -e^{-0.5\frac{(n(i,j)+\alpha)^2}{\alpha^2}}, & \text{if } n(i, j) < -\alpha \end{cases}$$

$$\text{Model 5: } n_e(i, j) = \begin{cases} \frac{n(i, j)}{\alpha} & \text{if } 0 \leq n(i, j) \leq \alpha \\ e^{\alpha - n(i,j)}, & \text{if } n(i, j) > \alpha \\ \frac{n(i, j)}{\alpha}, & \text{if } -\alpha \leq n(i, j) < 0 \\ -e^{\alpha + n(i,j)}, & \text{if } n(i, j) < -\alpha \end{cases}$$

where n(i, j) and ne(i, j) are the (i, j)th component of n and ne, respectively.

4. The method of claim 3 wherein $\alpha = 7$.

5. The method of any preceding claim wherein the similarity measurement is based on a comparative measure of the input and reference images.

6. The method of claim 5 wherein the comparative measure is vector based.

7. The method of claim 6 wherein the comparative measure has the form:

$$\rho_d = \frac{(n_e - \bar{n}_e) \cdot (P_d - \bar{P}_d)}{\|n_e - \bar{n}_e\| \cdot \|P_d - \bar{P}_d\|}.$$

8. A method of identifying a plurality of images as originating from the same image capture device the method comprising:
   classifying the image according to the method of any preceding claim; and
   further comprising the step of identifying a classified group of images as originating from the same image capture device.

9. The method of claim 8 wherein the similarity measure between the image i and the comparison image j is determined by $$\rho(i, j) = \frac{(n_i - \bar{n}_i) \cdot (n_j - \bar{n}_j)}{\|n_i - \bar{n}_i\| \cdot \|n_j - \bar{n}_j\|}.$$

10. Computer program product stored on a non-transitory computer-readable media comprising computer readable instructions encoded therein to enable the steps of any of method claims 1 to 9.

11. Apparatus for identifying an image taken by an image capturing device, the apparatus comprising:
- a processor enabled to extract an initial Sensor Noise Pattern (SNP) from the image;
- an enhancer enabled to enhance the initial SNP to create an enhanced SNP by applying a correcting model, wherein the correcting model scales the initial SNP by a factor which is an inverse function of the signal intensity of the initial SNP;
- a similarity measurer to determine the similarity between the enhanced SNP for said image with one or more previously calculated enhanced SNPs for one or more different images; and
- an identifier to identify the image capture device with its reference enhanced SNP most similar or identical to the enhanced SNP of the image under investigation based on the determined similarity measure.

12. Apparatus of claim 11 to enable the method of claims 1 to 9 wherein the processor performs the extracting step, the enhancer performs the enhancing step, the similarity measurer performs the determining step and the identifier performs the identify step.

* * * * *